United States Patent
Kim et al.

(10) Patent No.: US 11,922,127 B2
(45) Date of Patent: Mar. 5, 2024

(54) METHOD FOR OUTPUTTING TEXT IN ARTIFICIAL INTELLIGENCE VIRTUAL ASSISTANT SERVICE AND ELECTRONIC DEVICE FOR SUPPORTING THE SAME

(71) Applicant: SAMSUNG ELECTRONICS CO., LTD., Suwon-si (KR)

(72) Inventors: Kichul Kim, Suwon-si (KR); Yoonjae Park, Suwon-si (KR); Jooyong Byeon, Suwon-si (KR); Youngkyu Kim, Suwon-si (KR); Byungkeon Park, Suwon-si (KR); Soowon Jang, Suwon-si (KR); Changyong Jeong, Suwon-si (KR); Sungbin Jin, Suwon-si (KR); Jaeyung Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 346 days.

(21) Appl. No.: 17/296,463

(22) PCT Filed: May 21, 2021

(86) PCT No.: PCT/KR2021/006352
§ 371 (c)(1),
(2) Date: May 24, 2021

(87) PCT Pub. No.: WO2021/235890
PCT Pub. Date: Nov. 25, 2021

(65) Prior Publication Data
US 2023/0145198 A1    May 11, 2023

(30) Foreign Application Priority Data
May 22, 2020 (KR) .................. 10-2020-0061810

(51) Int. Cl.
*G06F 40/35* (2020.01)
*G06F 40/166* (2020.01)
(Continued)

(52) U.S. Cl.
CPC ............ *G06F 40/35* (2020.01); *G06F 40/143* (2020.01); *G06F 40/166* (2020.01);
(Continued)

(58) Field of Classification Search
CPC .... G06F 40/143; G06F 40/166; G06F 40/232; G06F 40/35; G10L 15/1815; G10L 15/22; G10L 25/63
See application file for complete search history.

(56) References Cited

U.S. PATENT DOCUMENTS 7,093,198 B1    8/2006 Paatero
7,117,159 B1 *  10/2006 Packingham .......... G10L 13/00
                                                    704/E15.044
(Continued)

FOREIGN PATENT DOCUMENTS

JP    2003-302992     10/2003
KR    10-2013-0057338    5/2013
(Continued)

OTHER PUBLICATIONS

English Translation of International Preliminary Report on Patentability Chapter I for PCT/KR2021/006352 dated Nov. 22, 2022 (Year: 2022).*
English Translation of the Written Opinion of the International Search Authority for PCT/KR2021/006352 dated Nov. 22, 2022 (Year: 2022).*
(Continued)

*Primary Examiner* — Eric Yen
(74) *Attorney, Agent, or Firm* — Nixon & Vanderhye P.C.

(57) ABSTRACT

According to an embodiment, an electronic device comprises: a memory, a communication module comprising communication circuitry, and a processor operatively connected with the memory and the communication module.
(Continued)

The processor is configured to control the electronic device to: obtain a utterance text corresponding to utterance speech, obtain an intent of the utterance text and emotion information based on the utterance speech and the utterance text, obtain a response text for the utterance text based on the intent of the utterance text and the emotion information, obtain a markup language including information about an output unit of text of the response text based on at least one of the intent of the utterance text, the emotion information, or the response text, and add the markup language to the response text and provide the response text. The text output unit is at least one selected from among a phoneme unit, a consonant and vowel unit, a syllable unit, or a word unit. A text output method in an artificial intelligence virtual assistant service of an electronic device may be performed using an artificial intelligence model.

20 Claims, 13 Drawing Sheets

(51) Int. Cl.
G06F 40/232 (2020.01)
G06F 40/143 (2020.01)
G10L 15/18 (2013.01)
G10L 15/22 (2006.01)
G10L 25/63 (2013.01)

(52) U.S. Cl.
CPC ........ *G06F 40/232* (2020.01); *G10L 15/1815* (2013.01); *G10L 15/22* (2013.01); *G10L 25/63* (2013.01)

(56) References Cited

U.S. PATENT DOCUMENTS

| | | | |
|---|---|---|---|
| 10,360,716 B1* | 7/2019 | van der Meulen | G10L 25/57 |
| 2003/0167167 A1* | 9/2003 | Gong | G10L 13/033 704/250 |
| 2008/0096533 A1* | 4/2008 | Manfredi | G06N 3/006 455/412.1 |
| 2010/0082349 A1* | 4/2010 | Bellegarda | G10L 13/08 704/260 |
| 2011/0184721 A1* | 7/2011 | Subramanian | G10L 19/0018 704/4 |
| 2014/0222436 A1* | 8/2014 | Binder | G10L 15/26 704/275 |
| 2014/0281995 A1 | 9/2014 | Kim et al. | |
| 2014/0324424 A1 | 10/2014 | Kim | |
| 2017/0256252 A1* | 9/2017 | Christian | G06F 40/30 |
| 2019/0164554 A1 | 5/2019 | Huang et al. | |
| 2019/0190865 A1 | 6/2019 | Jeon et al. | |
| 2020/0035216 A1 | 1/2020 | Yang et al. | |
| 2020/0184967 A1* | 6/2020 | Gupta | G06F 3/167 |
| 2020/0210710 A1 | 7/2020 | Lee et al. | |

FOREIGN PATENT DOCUMENTS

| | | |
|---|---|---|
| KR | 10-1278857 | 7/2013 |
| KR | 10-2019-0026927 | 3/2019 |
| KR | 10-2019-0031033 | 3/2019 |
| KR | 10-2019-0106890 | 9/2019 |
| KR | 10-2088909 | 4/2020 |

OTHER PUBLICATIONS

Search Report and Written Opinion dated Aug. 31, 2021 in counterpart International Patent Application No. PCT/KR2021/006352.

* cited by examiner

| TAG | Description | Attributes |
|---|---|---|
| <text> | identify text expanded with markup | |
| <typewriter> | effect of typing character by character | determine unit of application of text output selectable from among four unit types<br>- phoneme  phoneme unit<br>- consonant  consonance & vowel unit<br>- syllable  syllable unit (default)<br>- eojeol  word unit |
| <typo> | effect of causing typo | |
| <break> | pause for designated time | |
| <s> | pause between sentences | |
| common | · | time  control typing speed |
| common | · | replace-time  convert letters after given time |

FIG.4

```
<text>
    <typewriter type="phoneme" time="0.01s">
        The soup is so delicious
    </typewriter>
</text>
```
710 intermediate outputs : ð
ðə
ðə s
ðə suː
ðə suːp
⋮ final output : ðə suːp ɪz soʊ dɪˈlɪʃəs

FIG.7

```
<text>
    <typewriter type="consonant" time="0.01s">
        The soup is so delicious
    </typewriter>
</text> intermediate outputs : T
                      Th
                      The
                      The s
                      The so
                         ⋮ final output : The soup is so delicious
```

FIG.8

```
<text>
    <typewriter type="syllable" time="0.01s">
        The soup is so delicious
    </typewriter>
</text>
```
910 intermediate outputs : The
The soup
The soup is
The soup is so
The soup is so del
The soup is so deli
⋮ final output : The soup is so delicious

FIG.9

```
<text>
    <typewriter type="word" time="0.01s">
        The soup is so delicious
    </typewriter>
</text>
```
⎫
⎬ 1010
⎭ intermediate outputs : The
　　　　　　　　　　The soup
　　　　　　　　　　　⋮ final output : The soup is so delicious

FIG.10

METHOD FOR OUTPUTTING TEXT IN ARTIFICIAL INTELLIGENCE VIRTUAL ASSISTANT SERVICE AND ELECTRONIC DEVICE FOR SUPPORTING THE SAME

This application is the U.S. national phase of International Application No. PCT/KR2021/006352 filed May 21, 2021 which designated the U.S. and claims priority to Korean Patent Application No. 10-2020-0061810 filed May 22, 2020, the entire contents of each of which are hereby incorporated by reference.

TECHNICAL FIELD

The disclosure relates to a method for outputting text in an artificial intelligence virtual assistant service and an electronic device supporting the same.

BACKGROUND ART

Recently, artificial intelligence systems are being used in various fields. AI systems learn on their own and get smarter unlike existing rule-based smart systems. The more they are used, the more precisely AI systems may perceive and understand users' preference. Thus, legacy rule-based smart systems are being gradually replaced with deep learning-based AI systems.

Being provided nowadays are various services using artificial intelligence virtual assistants that provide responses to user speech inputs (e.g. Bixby™, Assistant™, or Alexa™).

DETAILED DESCRIPTION OF THE INVENTION

Technical Problem

The artificial intelligence virtual assistant (AI assistant) not only provides convenient functions to users but also attempts emotional bonding with users as a product representing companies and devices. The emotional bond between the user and the artificial intelligence virtual assistant may refer, for example, to the user treating the artificial intelligence virtual assistant as a living being and emotionally interacts with it.

Responses from artificial intelligence virtual assistants are largely divided into speech responses and text responses. The speech response may include a sound response from the speaker, and the text response may include a response displayed on the display of the device. Some conventional technologies sometimes adopt the speech synthesis markup language (SSML) to finely manipulate speech and tone. The SSML allows for use of the speed and pitch of the speech and sound effects and is thus widely in use.

However, conventional technologies do not effectively deliver text responses. When the AI virtual assistant's response is displayed as text on the screen, the whole text is simultaneously displayed on the screen, which limits expressing emotions or feelings.

Therefore, the user does not fully experience the emotion that the artificial intelligence virtual assistant intends to express but feels awkward. For example, when the AI virtual assistant asks a question, the correct answer may simultaneously be shown on the display. Therefore, the user may not feel like she is solving the questions. As another example, when the AI virtual assistant produces a spooky sound by way of, e.g., the SSML, the user may see the end of the story through the text on the display. As such, it is hard to establish an emotional bond in user experience.

The AI virtual assistant expresses various responses, such as for expressing concern about the user, embarrassment due to failure in understanding the user's speech, or telling a fun/scary story, in the same manner although the responses have different sentences and thus experiences difficulty in establishing an emotional bond with the user.

Technical Solution

In accordance with an example embodiment, an electronic device comprises: a memory, a communication module comprising communication circuitry, and a processor operatively connected with the memory and the communication module. The processor is configured to control the electronic device to: obtain an utterance text corresponding to utterance speech, obtain an intent of the utterance text and emotion information based on the utterance speech and the utterance text, obtain a response text for the utterance text based on the intent of the utterance text and the emotion information, obtain a markup language including information about a unit of text output of the response text based on at least one of the intent of the utterance text, the emotion information, or the response text, and add the markup language to the response text and provide the response text. The unit of text output may include at least one selected from among a phoneme unit, a consonant and vowel unit, a syllable unit, or a word unit.

In accordance with an example embodiment, a method of controlling an electronic device comprises: obtaining an utterance text corresponding to utterance speech, obtaining an intent of the utterance text and emotion information based on the utterance speech and the utterance text, obtaining a response text for the utterance text based on the intent of the utterance text and the emotion information, obtaining a markup language including information about a unit of text output of the response text based on at least one of the intent of the utterance text, the emotion information, or the response text, and adding the markup language to the response text and providing the response text. The unit of text output may include at least one selected from among a phoneme unit, a consonant and vowel unit, a syllable unit, or a word unit.

In accordance with an example embodiment, a terminal device comprises: a microphone, a display, a communication module comprising communication circuitry, and a processor. The processor is configured to control the terminal device to: transmit utterance speech received through the microphone to an external server, receive a response text corresponding to the utterance speech from the external server, and display the response text on the display in at least one unit of text output selected from among a phoneme unit, a consonant and vowel unit, a syllable unit, or a word unit, based on a markup language including information about the text output unit added to the response text.

Advantageous Effects

According to an example embodiment, in providing a response to a user utterance speech, an AI virtual assistant service may add a markup language to the response text according to the intent of the user's utterance and emotion information and display the response text, with the markup language reflected, thereby providing an enhanced emotional bond to the user.

BRIEF DESCRIPTION OF DRAWINGS

The above and other aspects, features and advantages of certain embodiments of the present disclosure will be more apparent from the following detailed description, taken in conjunction with the accompanying drawings, in which:

FIG. 4 is a chart illustrating examples of a markup language used for text output according to various embodiments;

FIG. 7 is a diagram illustrating example text output screen according to various embodiments;

FIG. 8 is a diagram illustrating an example operation of outputting text by a markup language according to various embodiments;

FIG. 9 is a diagram illustrating an example operation of outputting text by a markup language according to various embodiments;

FIG. 10 is a diagram illustrating an example operation of outputting text by a markup language according to various embodiments;

MODE FOR CARRYING OUT THE INVENTION

According to various example embodiments of the disclosure, there is provided a method for outputting text by an electronic device in an artificial intelligence (AI) virtual assistance service, which recognizes the user's speech and interprets the intent to obtain a markup language for outputting text. The method may receive the user's utterance speech signal from an external device via a communication module or receive a speech signal, which is an analog signal, through a microphone, and convert the speech portion into readable text using an automatic speech recognition (ASR) model. The user's intent of utterance may be obtained by interpreting the text using a natural language understanding (NLU) model. The ASR model or NLU model may be an artificial intelligence model. The artificial intelligence model may be processed by an artificial intelligence-dedicated processor designed in a hardware structure specified for artificial intelligence model processing. The artificial intelligence (AI) model may be obtained via training. Here, "obtained via training" may refer, for example, to a predefined operation rule or artificial intelligence model configured to achieve a desired feature (or goal) being obtained by training a default artificial intelligence model with multiple pieces of training data using a training algorithm. The artificial intelligence model may include a plurality of neural network layers. Each of the plurality of neural network layers includes a plurality of weight values and performs neural network computation by computation between the result of computation by a previous layer and the plurality of weight values.

Language understanding may refer, for example, to a technique for recognizing and applying/processing human language/text and includes, e.g., natural language processing, machine translation, dialog system, question answering, or speech recognition/synthesis.

Figure 1:
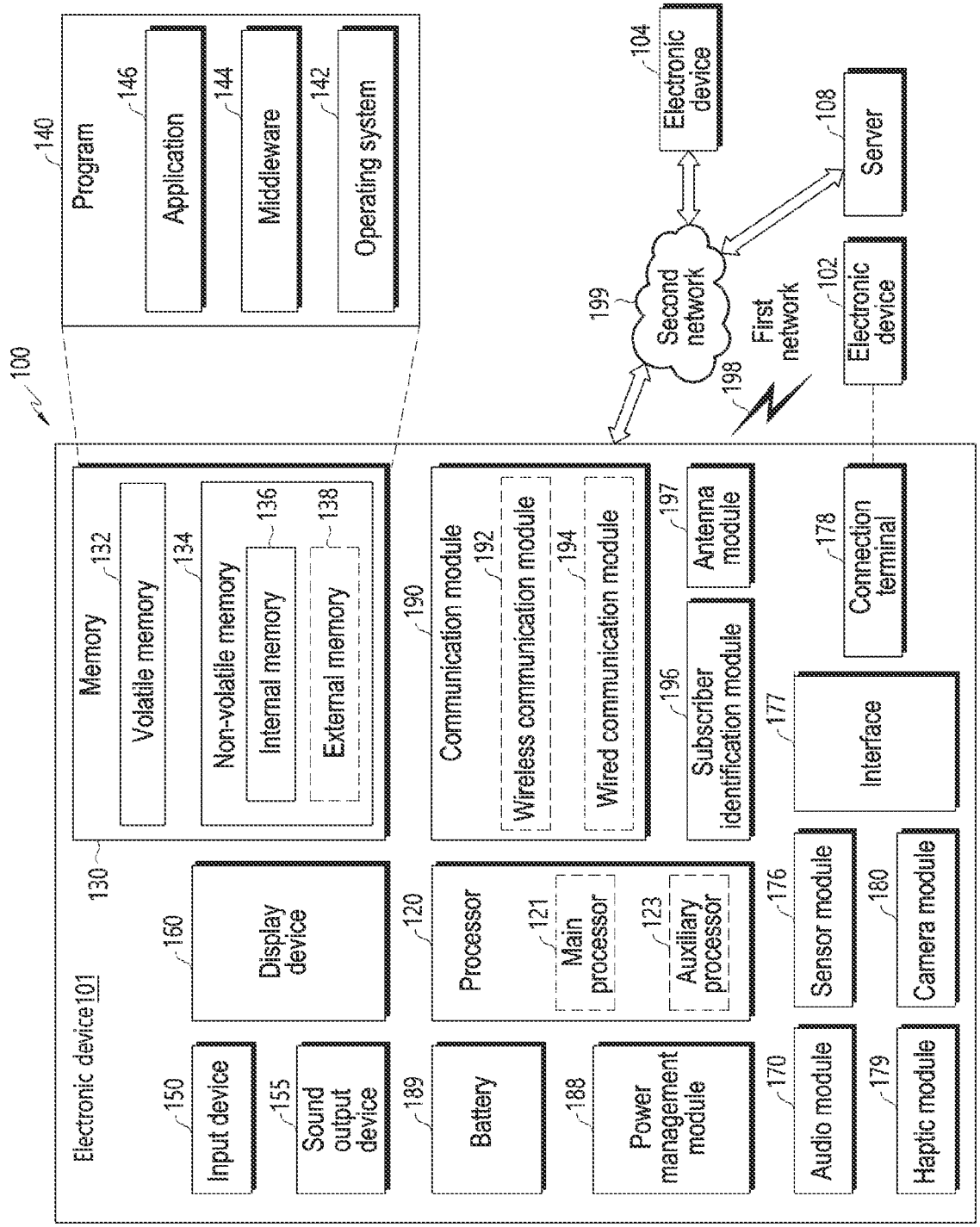
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module may include an antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
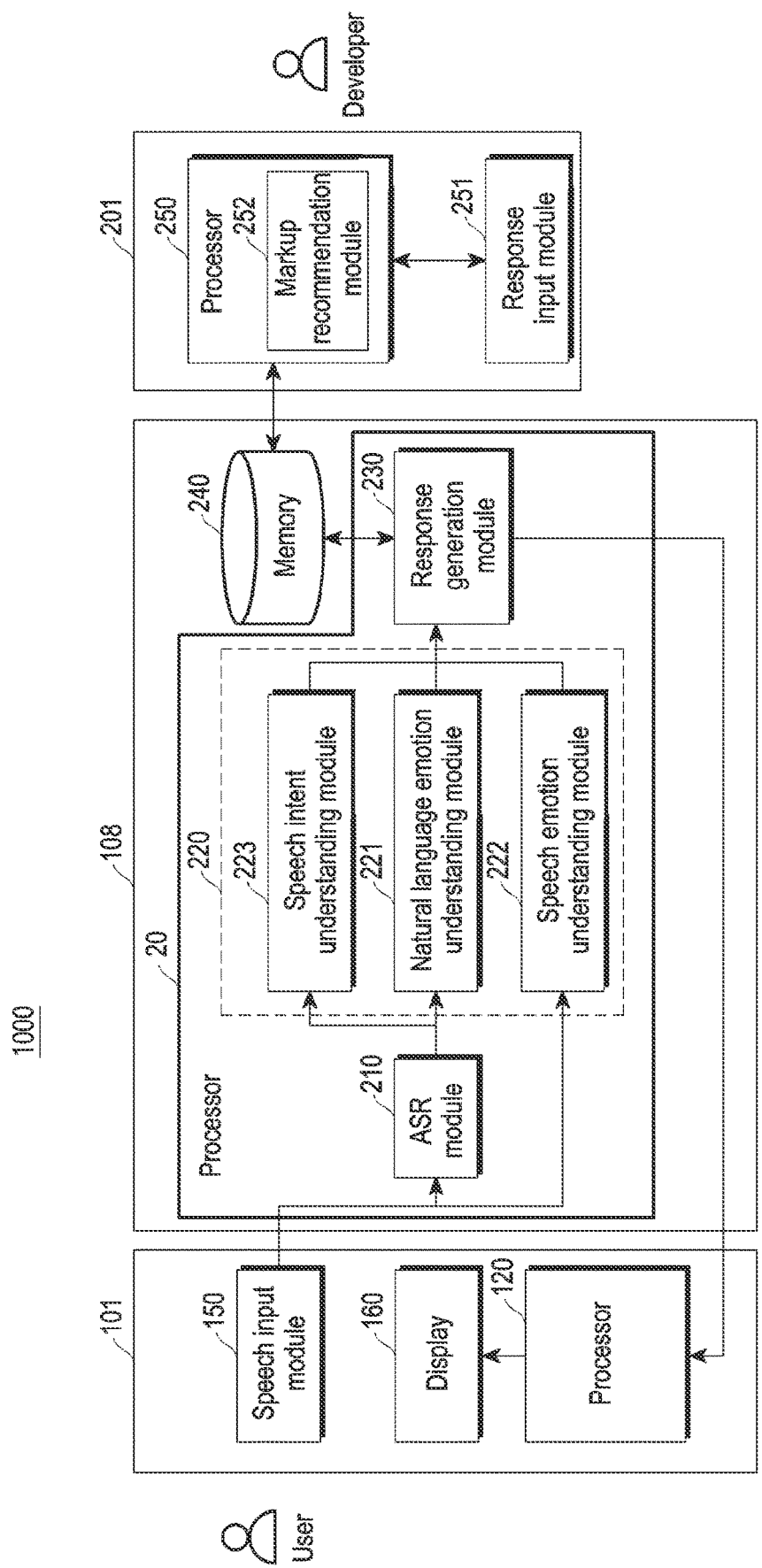
FIG. 2 is a block diagram illustrating an example system for providing an artificial intelligence virtual assistant service according to various embodiments.

FIG. 2 is a block diagram illustrating an example system for providing an artificial intelligence virtual assistant service according to various embodiments.

According to an embodiment, a system 1000 for providing an AI virtual assistant service may include at least one of an electronic device 101 (e.g., the electronic device 101 of FIG. 1, hereinafter referred to as the "user's terminal device 101"), an electronic device 108 (e.g., the server 108 of FIG. 1, hereinafter referred to as the "server 108") for generating responses, and an electronic device 201 (hereinafter, referred to as the "developer's terminal device 201"). According to an embodiment, the electronic device 201 may be a device at least partially similar to the electronic device 101 of FIG. 1. For example, the electronic device 201 may include a computer device, but is not limited thereto.

According to an embodiment, the user's terminal device 101 may include a speech input module (e.g., including input circuitry) 150 (e.g., the input device 150 of FIG. 1), a display 160 (e.g., the display device 160 of FIG. 1), and a processor (e.g., including processing circuitry) 120 (e.g., the processor 120 of FIG. 1).

According to an embodiment, the user's terminal device 101 may receive the user's utterance speech through the speech input module 150. For example, the speech input module 150 may include a microphone. The input module 150 is shown to be included in the user's terminal device 101, but is not limited thereto. For example, the input module 150 may include an external microphone connected to the user's terminal device 101. In an embodiment, the user's terminal device 101 may receive a request indicating execution of an application for providing an artificial intelligence virtual assistant service from the user and execute the application to receive the user utterance speech through the microphone.

According to an embodiment, the user's terminal device 101 may transmit the user's utterance speech to the server 108 through a communication module (not shown) (e.g., the communication module 190 of FIG. 1).

According to an embodiment, the server 108 may include a processor (e.g., including processing circuitry) 20, an ASR module (e.g., including processing circuitry and/or executable program elements) 210, an emotion and intent understanding module (e.g., including processing circuitry and/or executable program elements) 220, a response generation module (e.g., including processing circuitry and/or executable program elements) 230, and a memory 240. According to an embodiment, the ASR module 210, the emotion and intent understanding module 220, or the response generation module 230 may be included in at least one processor 20 of the server 108. For example, they may be included as software executed by the processor 20. In an embodiment, the server 108 may include two or more servers, and at least some operations of the ASR module 210, the emotion and intent understanding module 220, or the response generation module 230 may be performed by different servers.

According to an embodiment, when the server 108 receives the user utterance speech from the user's terminal device 101 through a communication module (not shown), the server 108 may convert the received user utterance speech into utterance text through the automatic speech recognition (ASR) module 210.

According to an embodiment, the ASR module 210 may include various processing circuitry and/or executable program elements and convert the received user utterance speech (e.g., the user's inquiry) into text data. For example, the ASR module may include a speech recognition module. The ASR module may include an acoustic model and a language model. For example, the acoustic modem may include vocalization-related information, and the language model may include unit phonemic information and information about unit phonemic information combinations. The ASR module may convert user utterances into text data using the vocalization-related information and unit phonemic information.

Although FIG. 2 illustrates that when a user utterance speech is input, utterance text for the user utterance speech is obtained through the ASR module 210, in an embodiment, the user may input an inquiry via text entry after the AI virtual assistant function is executed and, if text is input, enter the input text to the emotion and intent understanding module 220.

According to an embodiment, the server 108 may obtain the intent and emotion information for the received user utterance speech through the emotion and intent understanding module 220. The emotion and intent understanding module 220 may include various processing circuitry and/or executable program elements and use a trained artificial intelligence model included in the memory 240, and the trained artificial intelligence model may output the intent and emotion information for the input text using the text and speech as input data. For example, the server 108 may input the received user utterance speech and the utterance text obtained from the ASR module 210 into the emotion and intent understanding module 220, obtaining the intent and emotion information for the user utterance speech. For example, the emotion information may include information representing emotional states, such as joy, sadness, and anger felt in the user utterance speech.

According to an embodiment, the emotion and intent understanding module 220 may include a natural language emotion understanding module 221, a speech emotion understanding module 222, and a speech intent understanding module 223, each of which may include various processing circuitry and/or executable program elements.

According to an embodiment, the natural language emotion understanding module 221 may obtain first emotion information from linguistic information for the utterance text. For example, the natural language emotion understanding module 221 may obtain the first emotion information based on a specific word included in the utterance text. For example, when the utterance text is "Good morning," the natural language emotion understanding module 221 may obtain the first emotion information of "happy" based on "Good" and "morning" included in the utterance text.

In an embodiment, the natural language emotion understanding module 221 may obtain, as the first emotion information, information about interactions, such as positive or negative about a previous response, in a situation where the dialogue context is maintained.

According to an embodiment, when the first emotion information for the utterance text may not be obtained from the natural language emotion understanding module 221, the emotion and intent understanding module 220 may obtain only second emotion information obtained from the speech emotion understanding module 222 as the emotion information for the utterance text.

According to an embodiment, the speech emotion understanding module 222 may obtain the second emotion information from non-linguistic information for the received user utterance speech. For example, the speech emotion understanding module 222 may obtain the second emotion information by analyzing the speed, accent, tone, and intonation of the user utterance speech. For example, the speech emotion understanding module 222 may obtain the frequency characteristics by analyzing the spectrum of the user utterance speech. For example, the speech emotion understanding module 222 may obtain a frequency characteristic, such as the pitch of the user utterance speech, using the characteristics of the user utterance speech including at least one of the frequency, amplitude, period, and decibel of the user utterance speech, and may obtain a frequency characteristic, such as a change in the pitch of the speech, using a change in frequency and/or amplitude period.

According to an embodiment, the speech emotion understanding module 222 may identify, for example, and without limitation, at least one of the speed, accent, tone, and intonation corresponding to the user utterance speech based on the pitch of the user utterance speech and the change in the pitch of the user utterance speech and obtain the second emotion information for the user utterance speech based on, e.g., the identified speed, accent, tone, or intonation of the user utterance speech. For example, when the utterance text is "Good morning," the speech emotion understanding module 222 may obtain the second emotion information of "happy" based on at least one (e.g., a high tone or changes in pitch, as in humming) of the speed, accent, tone, and intonation of the utterance speech.

According to an embodiment, the emotion and intent understanding module 220 may obtain detailed emotion information based on the first emotion information and the second emotion information. For example, the emotion and intent understanding module 220 may obtain emotion information including a degree of "angry" based on the first emotion information and the second emotion information. In an embodiment, when the emotions of the first emotion information and the second emotion information are different from each other, the emotion and intent understanding module 220 may prioritize the second emotion information or, considering the weight of each emotion information, chose the emotion information with the higher weight from among the first emotion information and the second emotion information.

Although it is illustrated that the natural language emotion understanding module 221 and the speech emotion understanding module 222 are separate components, they may be implemented as a single AI model that uses utterance text and user utterance speech as input data, according to an embodiment.

According to an embodiment, the speech intent understanding module 223 may, for example, include a natural language understanding (NLU) module capable of grasping the user's intent based on the utterance text output from the ASR module 221.

According to an embodiment, the speech intent understanding module 223 may grasp the user's intent by performing syntactic analysis or semantic analysis. The syntactic analysis may divide the user input into syntactic units (e.g., words, phrases, or morphemes) and what syntactic elements the syntactic units have. The semantic analysis may be performed using at least one of semantic matching, rule matching, or formula matching. Thus, the NLU module may obtain a domain, intent, or parameters (or slots) necessary to represent the intent for the user input.

According to an embodiment, the speech intent understanding module 223 may determine the user's intent and parameters using the matching rule which has been divided into the domain, intent, and parameters (or slots) necessary to grasp the intent. For example, one domain (e.g., an alarm) may include a plurality of intents (e.g., alarm settings or releasing alarm), and one intent may include a plurality of parameters (e.g., time, repetition count, or alarm sound). The plurality of rules may include, e.g., one or more essential element parameters. According to an embodiment, the matching rule may be stored in a natural language understanding database (NLU DB) included in the memory 240.

According to an embodiment, the speech intent understanding module 223 may grasp the meaning of a word extracted from the user input using linguistic features (e.g., syntactic elements) such as morphemes or phrases, match the grasped meaning of the word to the domain and intent, and determine the user's intent. For example, the speech intent understanding module 223 may calculate how many words extracted from the user input are included in each domain and intent to thereby determine the user's intent. According to an embodiment, the speech intent understanding module 223 may determine the parameters of the user input using the word which is a basis for grasping the intent. According to an embodiment, the speech intent understanding module 223 may determine the user's intent using the NLU DB storing the linguistic features for grasping the intent of the user input.

According to an embodiment, the response generation module 230 may include various processing circuitry and/or executable program elements and obtain response text corresponding to the utterance text based on the intent and emotion information for the utterance text output from the emotion and intent understanding module 220. For example, the response generation module 230 may select the response text corresponding to the utterance text based on the intent and emotion information for the utterance text from among a plurality of response texts stored in a response database included in the memory 240. According to an embodiment, at least some of the plurality of response texts included in the response database may be received from the developer's terminal device 201 and then stored in the response database. According to an embodiment, at least some of the plurality of response texts included in the response database may include only text, and at least others may include markup language-added text. The markup language may refer, for example, to a language for expressing a display style, such as the arrangement, size, and shape of the response text.

According to an embodiment, the response generation module 230 may obtain a markup language related to display of the obtained response text. For example, when the obtained response text includes only text that does not include a markup language, the response generation module 230 may obtain a markup language from a markup language database or, when the obtained response text includes a markup language, the response generation module 230 may obtain the included markup language. Even when the obtained response text includes a markup language, the response generation module 230 may obtain a markup language from the markup language database.

According to an embodiment, the response generation module 230 may obtain a markup language including information about the text output unit of the response text based, for example, and without limitation, on at least one of the intent of the utterance text, emotion information, or response text. For example, the text output unit may be a unit related to the reproduction (e.g., display) of the response text and, as the text output unit, at least one of a phoneme unit, a consonant and vowel unit, a syllable unit, or a word unit may be selected. According to an embodiment, the text output unit may further include, for example, and without limitation, a stroke unit and a character unit depending on the characteristics of each language.

According to an embodiment, the markup language may further include information about at least one of the reproduction speed, font, font color, font size, or reproduction pause of the text. According to an embodiment, the markup language may include information about the operation of displaying a typo in at least a portion of the response text and, after deleting the type, displaying the portion of the response text. Various embodiments of the markup language are described in greater detail below with reference to FIGS. 7, 8, 9, 10 and 11.

According to an embodiment, the response generation module 230 may obtain a markup language including information about the speed of text output (e.g., display) corresponding to the response text based on the speed of the speech output corresponding to the response text. For example, the response generation module 230 may obtain a markup language such that the speech output of each text in the response text and the text display for each text in the response text temporally coincide with each other.

According to an embodiment, the response generation module 230 may select at least one markup language based on at least one of the response text, intent of utterance text, or emotion information among a plurality of markup languages stored in the memory 240. For example, the response generation module 230 may select at least one markup language from among the plurality of markup languages stored in the markup language database included in the memory 240, based on at least one of the response text, intent of utterance text, or emotion information.

According to an embodiment, each of the plurality of markup languages stored in the memory 240 may be matched and stored with at least one of the response text, intent of utterance text, or emotion information. For example, each of the plurality of markup languages may be matched to be a response including an emotional exchange for at least one of the response text, the intent of the utterance text, or the emotion information.

According to an embodiment, when none of the plurality of markup languages stored match the response text, intent of utterance text, or emotion information, the response generation module 230 may select a markup language corresponding to at least one of the response text, intent of utterance text, or emotion information, which has the highest similarity to the response text, intent of utterance text, or emotion information. For example, when none of the plurality of markup languages stored match at least one of the intent of utterance text or emotion information obtained by the intent and emotion understanding module 220 or the response text, the response generation module 230 may identify the response text, intent, or emotion information having the highest similarity among the response texts, intents of response text, or emotion information individually matched to the plurality of stored markup languages and select the markup language corresponding to the identified response text, intent, or emotion information. According to an embodiment, the highest similarity may refer, for example, to the difference in parameter value for identifying the response text, intent, or emotion information being the smallest.

According to an embodiment, at least some of the plurality of markup languages may be matched with the response text, and the response text received from the developer's terminal device 201 and the matched markup language may be stored in the markup language database included in the memory 240. For example, the developer's terminal device 201 may receive a response text from the developer through the response input module (e.g., including input circuitry) 251. According to an embodiment, the response input module 251 may include various input circuitry, such as, for example, and without limitation, at least one of a keyboard, a mouse, a touch screen, or a display through which the developer may input response text. For example, the developer's terminal device 201 may receive a response text from the developer through a response input screen displayed through the display. An embodiment of the response input screen is described in greater detail below with reference to FIG. 13.

According to an embodiment, when a response text is input by the developer through the response input module 251, the developer's terminal device 201 (e.g., a processor 250 of the developer's terminal device) may transmit the input response text to the server 108 through a communication module of the developer's terminal device 201.

According to an embodiment, upon receiving the response text from the developer's terminal device 201, the server 108 (e.g., the processor 20 of the server) may identify at least one response text whose similarity to the received response text is a preset value or more among the plurality of response texts stored in the memory 240.

According to an embodiment, the server 108 may provide at least one markup language used for at least one response text whose similarity to the received response text among the plurality of markup languages stored in the memory 240 is the preset value or more, as the markup language for the response text, to the developer's terminal device 201. For example, the similarity to the response text may refer, for example, to the similarity in at least one of the text itself or the intent of the text.

According to an embodiment, when emotion information is input by the developer through the response input module 251 in addition to the response text, the server 108 may provide at least one markup language to the developer's terminal device 201 further considering the emotion information as well as the response text.

According to an embodiment, the markup recommendation module 252 of the developer's terminal device 201 may include various processing circuitry and/or executable program elements and display at least one markup language received from the server 108, as a recommendation markup language, on the display of the terminal device 201. For example, the markup recommendation module 252 of the developer's terminal device 201 may provide at least one markup language, stored in the developer's terminal device 201 or received from the server 108, as the recommendation markup language, to the developer through a response input screen.

According to an embodiment, the markup recommendation module 252 may be included in the processor 250 of the developer's terminal device 201. For example, it may be software that may be executed by the processor.

According to an embodiment, the developer may select at least one recommended markup language or may directly input through the response input module 251 as a markup language for the input response text.

According to an embodiment, the developer's terminal device 201 may transmit the markup language, selected or input, to the server 108, and the server 108 may match the selected markup language or the input markup language with the response text received from the developer's terminal device 201 and store them in the memory 240.

According to an embodiment, the response generation module 230 may add the obtained markup language to the obtained response text and provide them to the user's electronic device 101. For example, the response generation module 230 may transmit the markup language-added response text to the user's electronic device 101 through the communication module (not shown) of the server 108.

According to an embodiment, upon receiving the markup language-added response text from the server 108, the processor 120 of the user's electronic device 101 may control the display 160 to display the response text, with the markup language reflected. For example, the processor 120 may display the response text on the display 160 sequentially per at least one text output unit selected from among the phoneme unit, the consonant and vowel unit, the syllable unit, or the word unit, based on the markup language including the information about the text output unit added to the response text. Various embodiments of outputting text according to the markup language are described in greater detail below with reference to FIGS. 7, 8, 9, 10 and 11.

According to an embodiment, upon receiving the markup language-added response text from the server 108, the processor 120 may extract the tag necessary for reproduction from the added markup language and display the response text on the display 160 using the extracted tag.

According to an embodiment, at least some operations of the server 108 may be implemented to be performed by the user's terminal device 101. For example, at least some operations of the ASR module 210, the intent and emotion understanding module 220, or the response generation module 230 may be implemented on the user's terminal device 101, and the generated response text may be displayed through the display 160.

As described above, according to an embodiment, in providing a response to the user utterance speech, a markup language is added to the response text according to at least one of the user's speech intent emotion information and the response text, and the response text is displayed with the markup language reflected. Therefore, the user may experience an enhanced emotional bond with the artificial intelligence virtual assistant.

Figure 3:
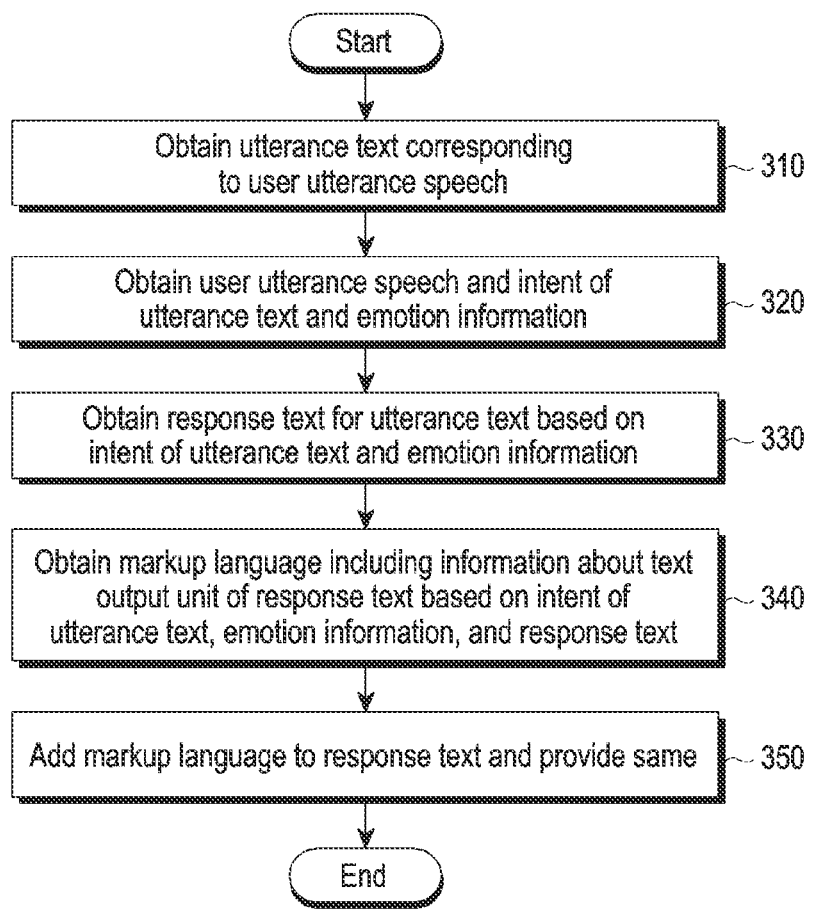
FIG. 3 is a flowchart illustrating an example operation of outputting text in an artificial intelligence virtual assistant service according to various embodiments.

FIG. 3 is a flowchart illustrating an example operation of outputting text in an artificial intelligence virtual assistant service according to various embodiments.

According to an embodiment, operations 310, 320, 330, 340 and 350 may be understood as performed by the processor 20 of the electronic device (e.g., the server 108 of FIG. 1).

According to an embodiment, in operation 310, the electronic device (e.g., the server 108 of FIG. 1) may obtain an utterance text corresponding to the user utterance speech. According to an embodiment, the user utterance speech may be input through a microphone provided in the user's terminal device (e.g., the user's terminal device 101 of FIG. 2) connected to the electronic device (e.g., the server 108 of FIG. 1) and may be received from the user's terminal device 101 through the communication module. According to an embodiment, when the electronic device is implemented as a terminal device, the user utterance speech may be input through the microphone provided in the electronic device.

According to an embodiment, the electronic device (e.g., the server 108 of FIG. 1) may obtain an utterance text corresponding to the user utterance speech through the ASR module (e.g., the ASR module 210 of FIG. 2). For example, when the user utterance speech is "Goodbye," the electronic device (e.g., the server 108 of FIG. 1) may obtain the utterance text "Goodbye" corresponding to the user utterance speech.

According to an embodiment, when the user's query text is input through the user's terminal device (e.g., the user's terminal device 101 of FIG. 2), the user's terminal device (e.g., the user's terminal device 101 of FIG. 2) may transmit the query text to the electronic device (e.g., the server 108 of FIG. 1), and the electronic device (e.g., the server 108 of FIG. 1) may obtain a response to the received inquiry text according to an embodiment.

According to an embodiment, in operation 320, the electronic device (e.g., the server 108 of FIG. 1) may obtain the intent and emotion information for the utterance speech and the utterance text. For example, the electronic device (e.g., the server 108 of FIG. 1) may obtain the intent and emotion information for the utterance speech and the utterance text using a trained artificial intelligence model. According to an embodiment, the trained artificial intelligence model may output the intent and emotion information for the input text using text and speech as input data. For example, when the utterance text input to the trained artificial intelligence model is "hello," "greeting" as the intent of the utterance text and "happy" as emotion information may be output.

According to an embodiment, in operation 330, the electronic device (e.g., the server 108 of FIG. 1) may obtain a response text for the utterance text based on the intent and emotion information of the utterance text. For example, the electronic device (e.g., the server 108 of FIG. 1) may select a response text for the utterance text based on the intent and emotion information for the utterance text from among a plurality of response texts stored in the response database. According to an embodiment, the plurality of response texts stored in the response database may be stored by the developer. For example, the electronic device (e.g., the server 108 of FIG. 1) may obtain the response text "Good morning" based on the intent "greeting" of the utterance text and the emotion information "happy".

According to an embodiment, in operation 340, the electronic device (e.g., the server 108 of FIG. 1) may obtain a markup language including the information about the text output unit of the response text based on the intent of the utterance text, emotion information, and response text. For example, the electronic device (e.g., the server 108 of FIG. 1) may obtain a markup language from the markup language database or, when the obtained response text includes a markup language, the electronic device (e.g., the server 108 of FIG. 1) may obtain the included markup language. Even when the obtained response text includes a markup language, the electronic device (e.g., the server 108 of FIG. 1) may obtain a markup language from the markup language database.

According to an embodiment, the electronic device (e.g., the server 108 of FIG. 1) may obtain a markup language as shown, by way of non-limiting example, in Table 1, based on at least one of the intent of "hello" uttered by the user, emotion information, or response text. For example, the electronic device (e.g., the server 108 of FIG. 1) may determine a response type based on at least one of the intent of the user utterance speech, emotion information, or response text and obtain a markup language based on the determined response type.

TABLE 1

| intent | emotion | response type | markup |
|---|---|---|---|
| greeting | happy | normal | <text>Good morning</text> |
| greeting | angry | embarrassed | <text><br><typo replace="Good">God</typo><br><break time="3s">Morning</break><br></text> |
| greeting | normal | difference | <text><br><typewriter type="syllable" time=0.01s><br>Good morning<br></typewriter><br></text> |

According to an embodiment, the electronic device (e.g., the server 108 of FIG. 1) may obtain a markup language including information about the text output unit of the response text based on at least one of the intent of the utterance text, emotion information, or response text. For example, the text output unit is a unit related to the reproduction (e.g., display) of the response text and, as the text output unit, at least one of a phoneme unit, a consonant and vowel unit, a syllable unit, or a word unit may be selected. According to an embodiment, the text output unit may further include a stroke unit and a character unit based on the characteristics of each language.

According to an embodiment, the markup language may further include information about the operations of displaying information about at least one of the reproduction speed, font, font color, font size, or text reproduction pause of the text, or a typo in at least a portion of the response text and, after deleting the typo, displaying at least the portion of the response text. For example, if the user utterance speech is "Tell me contact info for friend A quickly", the electronic device (e.g., the server 108 of FIG. 1) may identify that the intent of the utterance text is "information request" and may obtain the emotion information of "hasty" based on the fact that the utterance text includes "quickly" and the user utterance speech is fast and high tone. According to an embodiment, the electronic device (e.g., the server 108 of FIG. 1) may obtain a markup language so that the text reproduction speed is high.

In an embodiment, the markup language may include information about the operation of displaying a specific text in larger size to alarm the user or in red to scare the user. According to an embodiment, the electronic device (e.g., the server 108 of FIG. 1) may obtain a markup language including information about the operation of displaying a typo in at least a portion of the response text and, after deleting the typo, displaying at least the portion of the response text to express the emotion of embarrassment, in response to the user's emotion information of angry obtained from the user utterance speech.

As an embodiment, when the user utterance speech is "What schedule do I have at 11 AM tomorrow?" the electronic device (e.g., the server 108 of FIG. 1) may determine that the intent of the user utterance speech is "information request" and may obtain a markup language for outputting "Your schedule at 11 AM tomorrow is" sequentially in character units, and "lunch with friend A" simultaneously for the response text saying "Your schedule at 11 AM tomorrow is lunch with friend A." Therefore, the electronic device (e.g., the server 108 of FIG. 1) may stress and provide the requested information while allowing the user to feel like she has a conversation with the AI assistant.

In an embodiment, when the user utterance speech is "Is there something fun," the electronic device (e.g., the server 108 of FIG. 1) may determine that the intent of the user utterance speech is "solving a fun question and obtain a markup language to allow the text output to pause for a predetermined time between the question and answer which are the response text, thereby interesting the user.

According to an embodiment, the electronic device (e.g., the server 108 of FIG. 1) may obtain a markup language including information about the speed of text output (e.g., display) corresponding to the response text based on the speed of the speech output corresponding to the response text.

According to an embodiment, in operation 350, the electronic device (e.g., the server 108 of FIG. 1) may add the markup language to the response text and provide them. For example, the electronic device (e.g., the server 108 of FIG. 1) may add the obtained markup language to the obtained response text and transmit them to the user's terminal device (e.g., the electronic device 101 of FIG. 1). In an embodiment, when the electronic device is implemented as a terminal device, the electronic device may display the response text, with the markup language reflected, through the display provided in the electronic device.

FIG. 4 is a chart illustrating various examples of a markup language used for text output according to various embodiments.

According to an embodiment, the markup language may include a plurality of tags, and the response text may have various output forms based on the tags added to the response text. For example, when <text> is added to the response text, it may be identified as text expanded with markup.

According to an embodiment, when <typewriter> is added to the response text, the response text is displayed sequentially character by character, rather than simultaneously in whole, and the text output unit may be at least one of the phoneme unit, the consonant and vowel unit, the syllable unit, or the word unit. According to an embodiment, the text output unit may further include the stroke unit and the character unit based on the characteristics of each language.

According to an embodiment, types of markup language may include <typo> which may be a tag for an effect causing a typo, <break> which may be a tag for pausing the text output for a designated time, and <s> which may be a tag for pausing the text output between sentences and, not as tags but as attributes that may be inserted into tags, may include "time" for controlling the typing speed and "replace-time" for converting a character after a given time. The markup language is not limited to the above-described example, and a function corresponding to a tag or attribute may be set by the user.

Figure 5:
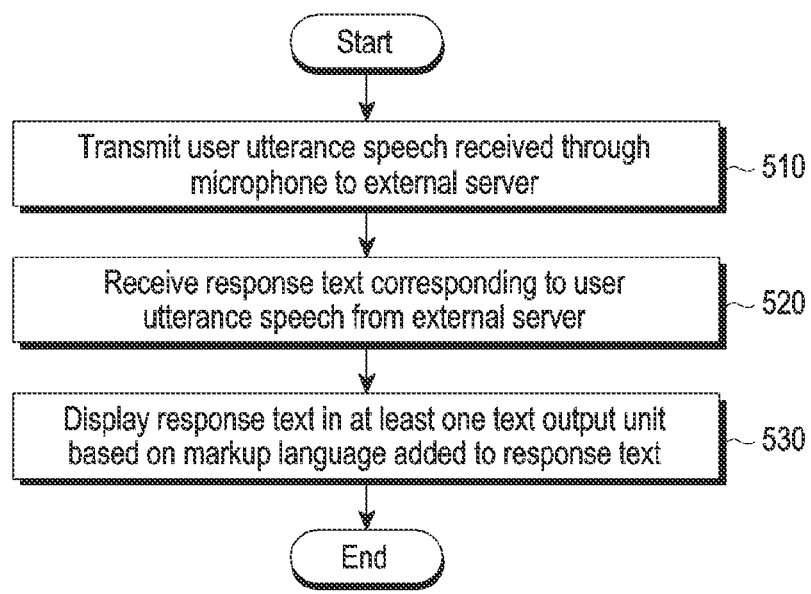
FIG. 5 is a flowchart illustrating an example operation of outputting text by a terminal device using an artificial intelligence virtual assistant service, according to various embodiments.

FIG. 5 is a flowchart illustrating an example operation of outputting text by a terminal device using an artificial intelligence virtual assistant service, according to various embodiments.

According to an embodiment, operations 510, 520 and 530 may be understood as performed by the processor 120 of the terminal device (e.g., the electronic device 101 of FIG. 1).

According to an embodiment, in operation 510, the terminal device (e.g., the electronic device 101 of FIG. 1) may transmit the user utterance speech received from the microphone to an external server (e.g., the server 108). According to an embodiment, the terminal device (e.g., the electronic device 101 of FIG. 1) may receive the user utterance speech through a microphone (e.g., the input device 150) provided in the terminal device (e.g., the electronic device 101 of FIG. 1) or receive the user utterance speech through an external microphone connected with the terminal device (e.g., the electronic device 101 of FIG. 1) and transmit the received user utterance speech to the external server (e.g., the server 108) through a communication module (e.g., the communication module 190).

According to an embodiment, in operation 520, the terminal device (e.g., the electronic device 101 of FIG. 1) may receive a response text corresponding to the user utterance speech from the external server (e.g., the server 108). According to an embodiment, the terminal device (e.g., the electronic device 101 of FIG. 1) may receive a response text to which a markup language for outputting text is added, from the external server (e.g., the server 108) through the communication module (e.g., the communication module 190).

According to an embodiment, in operation 530, the terminal device (e.g., the electronic device 101 of FIG. 1) may display the response text as per at least one text output unit of the phoneme unit, the consonant and vowel unit, the syllable unit, or the word unit, based on the markup language including information about the text output unit, added to the response text. For example, the response text may be sequentially displayed on the display (e.g., the display device 160) based on the selected text output unit.

According to an embodiment, the markup language added to the response text may further include at least one of the reproduction speed, font, font color, font size, or reproduction pause of the text.

Figure 6:
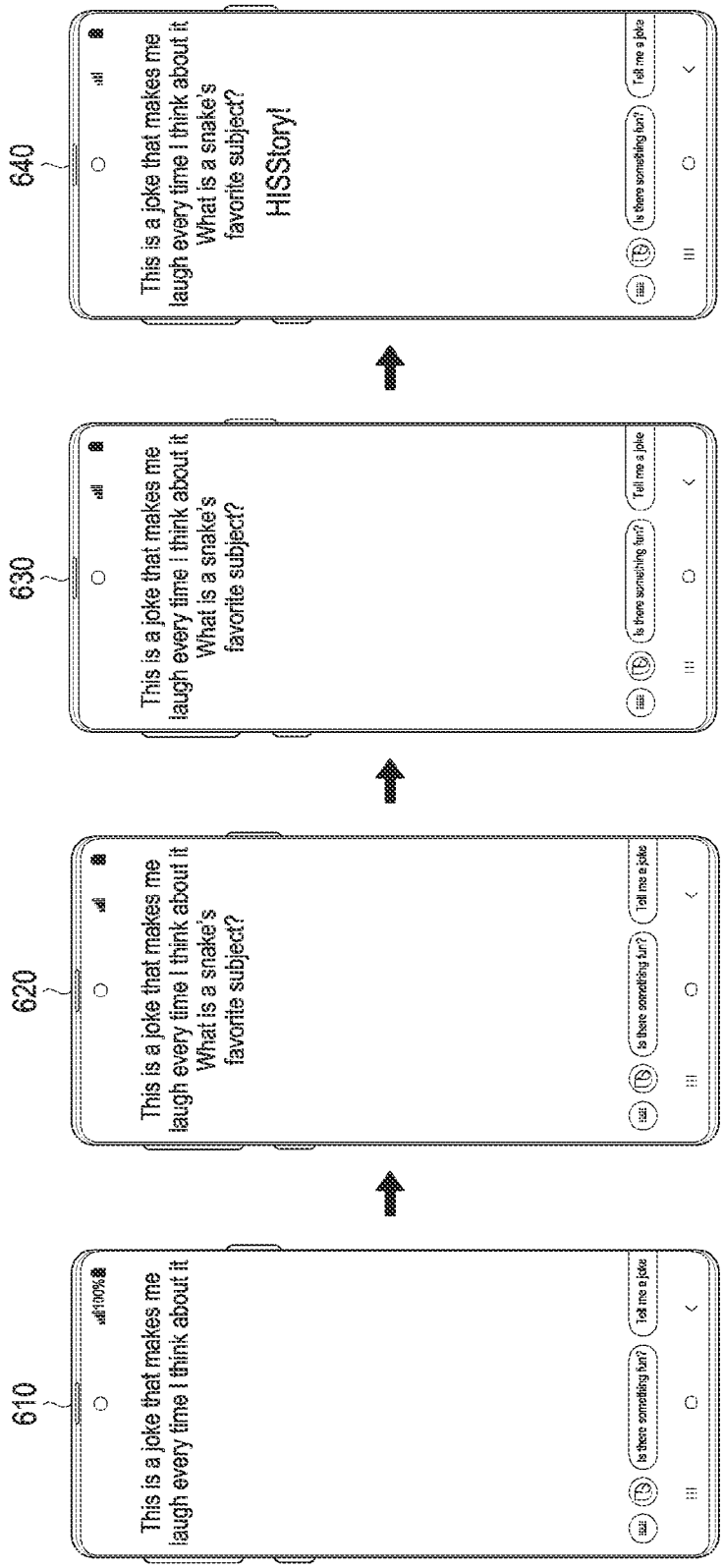
FIG. 6 is a diagram illustrating an example operation of outputting text by a terminal device using an artificial intelligence virtual assistant service, according to various embodiments.

FIG. 6 is a diagram illustrating an example text output screen of a terminal device using an artificial intelligence virtual assistant service, according to various embodiments.

Referring to FIG. 6, according to an embodiment, the text displayed on screen 610, 620, 630, and 640 of a terminal device (e.g., the electronic device 101 of FIG. 1) may be a response text corresponding to an input user utterance speech. For example, when the user activates the AI virtual assistant service on the terminal device (e.g., the electronic device 101 of FIG. 1) and utters a speech saying, "Is there something fun?" the terminal device (e.g., the electronic device 101 of FIG. 1) may transmit the user utterance speech to a server (e.g., the server 108 of FIG. 1) for generating a response and receive a response text for the user utterance speech from the server (e.g., the server 108 of FIG. 1). According to an embodiment, the received response text may include a markup language for outputting text, selected based on at least one of the response text, intent of the user utterance speech or emotion information. For example, referring to FIG. 6, the markup language may be one obtained based on at least of the response text "This is a joke that makes me laugh every time I think about it. What is a snake's favorite subject? HISStory!" the intent of utterance text "solving a fun question," or the emotion information "bored."

For example, the received response text may include a markup language as shown in Table 2 below.

TABLE 2

<text>
<s>This is a joke that makes me laugh every time I think about it</s> What is a snake's favorite subject?<break time="3s">HISStory!
</text>

According to an embodiment, the terminal device (e.g., the electronic device 101 of FIG. 1) may receive the response text to which the markup language as shown in Table 2 is added, from the server (e.g., the server 108 of FIG. 1) for generating a response, analyze the added markup language, and sequentially display the text.

For example, the terminal device (e.g., the electronic device 101 of FIG. 1) may display and then pause the first sentence "This is a joke that makes me laugh every time I think about it" as shown on the first screen 610 based on the <s> tag and then display the second sentence "What is a snake's favorite subject?" as shown on the second screen 620. The terminal device (e.g., the electronic device 101 of FIG. 1) may pause for three seconds as shown on the third screen 630, based on the <break time="3s"> tag and then display "HISStory!" as shown on the fourth screen 640.

In a case where the response text is a question, the conventional comparative example displays both the question and answer simultaneously whereas an embodiment of the disclosure displays the answer after pause for several seconds to thereby raise the user's expectation and hence allow the user to experience an enhanced emotional bond with the AI virtual assistant service.

FIGS. 7, 8, 9, 10 and 11 are diagrams illustrating an example operation of outputting text by a markup language according to various embodiments.

Referring to FIG. 7, according to an embodiment, a text output unit which is the phoneme unit may be included in a markup language-added response text 710. The phoneme refers to the smallest unit of sound to distinguish in meaning, and when the user hears the response text "The soup is so delicious" in voice, it may be sequentially displayed in the smallest units that may be distinguished by sound.

For example, based on the <typewriter type="phoneme" time="0.01s"> tag, the electronic device (e.g., the electronic device 101 of FIG. 2) may display the intermediate outputs for " ðə su ːp ɪz soʊ dɪˈlɪʃəs" which are the sounds of the response text "The soup is so delicious," on the display (e.g., the display device 160 of FIG. 1) every 0.01 seconds, sequentially in the phoneme units, such as ' ð', ' ðə', ' ðəs', ' ðəsu ː', ' ðə su ːp', ' ðə su ːp ɪ', 'ðə su ːp ɪz', 'ðə su ːp ɪz s' and then finally display 'ðə suːp ɪz soʊ dɪˈlɪʃəs' on the display (e.g., the display device 160 of FIG. 1).

According to an embodiment, when the response text is the English word "school," the electronic device (e.g., the electronic device 101 of FIG. 2) may display the intermediate outputs 's,' 'sk,' and 'sku:" sequentially in the phoneme units on the display (e.g., the display device 160 of FIG. 1) and then display 'sku:l' as the final output on the display (e.g., the display device 160 of FIG. 1).

Referring to FIG. 8, according to an embodiment, a text output unit which is the consonance & vowel unit may be included in a markup language-added response text 810. The consonant & vowel refers to the smallest unit of letter to distinguish in meaning, and the response text "The soup is so delicious" may be sequentially displayed in the smallest units of letter.

For example, based on the <typewriter type="consonant"time="0.01s"> tag, the electronic device (e.g., the electronic device 101 of FIG. 2) may display the intermediate outputs for the response text "The soup is so delicious," on the display (e.g., the display device 160 of FIG. 1) every 0.01 seconds, sequentially in the consonant & vowel units, such as 'T', 'Th', 'The', 'The s', 'The so', 'The sou', 'The soup', 'The soup i' and then finally display 'The soup is so delicious' on the display (e.g., the display device 160 of FIG. 1).

According to an embodiment, when the response text is the English word "school," the electronic device (e.g., the electronic device 101 of FIG. 2) may display the intermediate outputs 's,' 'sch,' and 'schoo" sequentially in the consonant & vowel units on the display (e.g., the display device 160 of FIG. 1) and then display 'school' as the final output on the display (e.g., the display device 160 of FIG. 1).

Referring to FIG. 9, according to an embodiment, a text output unit which is the syllable unit may be included in a markup language-added response text 910. The syllable refers to the unit of pronunciation uttered without interruption, loosely, a single sound, and the response text, "The soup is so delicious", may be sequentially displayed in units of letters that may be simultaneously pronounced.

For example, based on the <typewriter type="syllable" time="0.01s"> tag, the electronic device (e.g., the electronic device 101 of FIG. 2) may display the intermediate outputs for the response text "The soup is so delicious," on the display (e.g., the display device 160 of FIG. 1) every 0.01 seconds, sequentially in the syllable units, such as 'The', 'The soup', 'The soup is', 'The soup is so', 'The soup is so del', 'The soup is so deli' and then finally display 'The soup is so delicious' on the display (e.g., the display device 160 of FIG. 1).

According to an embodiment, when the response text is the English word "watermelon," the electronic device (e.g., the electronic device 101 of FIG. 2) may display the intermediate outputs 'wa,' 'water,' and 'watermel" sequentially in the syllable units on the display (e.g., the display device 160 of FIG. 1) and then display 'watermelon' as the final output on the display (e.g., the display device 160 of FIG. 1). According to an embodiment, when the response text is in English, and the text output unit is the character unit, the electronic device (e.g., the electronic device 101 of FIG. 2) may display the intermediate outputs 'w,' 'wa,' 'wat,' 'wate,' and 'water' sequentially in the character units on the display (e.g., the display device 160 of FIG. 1) and then display 'watermelon' as the final output on the display (e.g., the display device 160 of FIG. 1).

Referring to FIG. 10, according to an embodiment, a text output unit which is the word unit may be included in a markup language-added response text 1010. The word may refer, for example, to each of the segments of a sentence, and the response text "The soup is so delicious" may be sequentially displayed in units of segments separated by spaces.

For example, based on the <typewriter type="word" time="0.01s"> tag, the electronic device (e.g., the electronic device 101 of FIG. 2) may display the intermediate outputs for the response text "The soup is so delicious," on the display (e.g., the display device 160 of FIG. 1) every 0.01 seconds, sequentially in the word units, such as 'The', 'The soup' and then finally display 'The soup is so delicious' on the display (e.g., the display device 160 of FIG. 1).

According to an embodiment, when the response text is the English sentence "This soup is delicious," the electronic device (e.g., the electronic device 101 of FIG. 2) may display the intermediate outputs 'This,' 'This soup,' and 'This soup is" sequentially in the word units on the display (e.g., the display device 160 of FIG. 1) and then display 'This soup is delicious' as the final output on the display (e.g., the display device 160 of FIG. 1).

Figure 11:
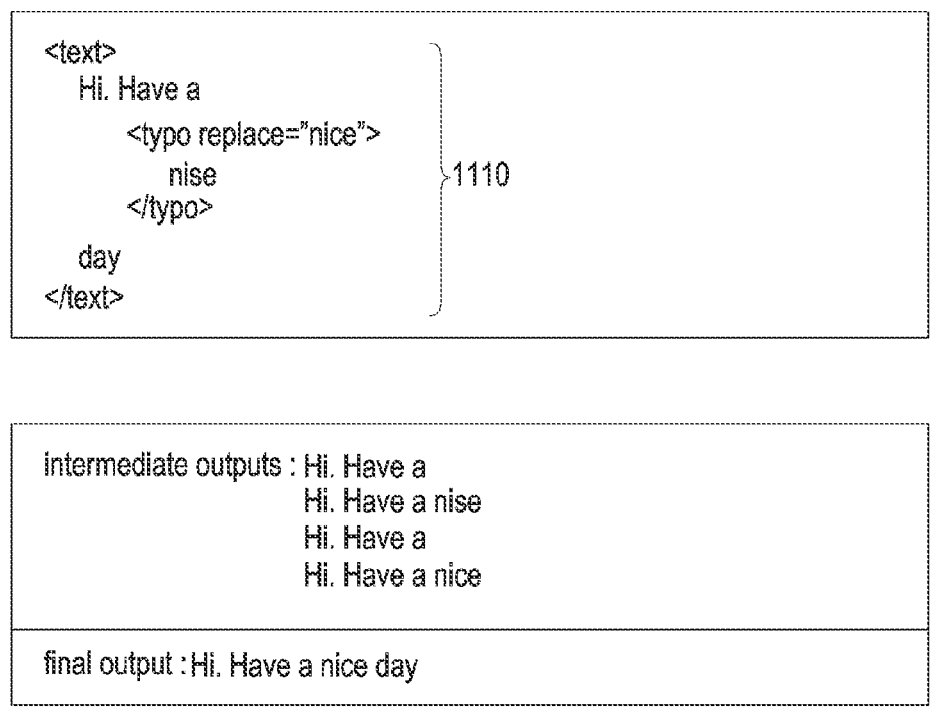
FIG. 11 is a diagram illustrating an example operation of outputting text by a markup language according to various embodiments.

Referring to FIG. 11, according to an embodiment, the markup language-added response text 1110 may include a markup language for displaying an intentional typo in at least a portion of the response text and, after deleting the typo, displaying the response text.

For example, based on the <typo replace="nice"> tag, the electronic device (e.g., the electronic device 101 of FIG. 2) may sequentially display the intermediate outputs for the response text and delete the typo, such as 'Hi. Have a', 'Hi. Have a nise', 'Hi. Have a', 'Hi. Have a nice', on the display (e.g., the display device 160 of FIG. 1) and then finally display 'Hi. Have a nice day' on the display (e.g., the display device 160 of FIG. 1).

According to an embodiment, the markup language of FIG. 11 may include more text output units, and in this case, the response text may be displayed based on a selected text output unit.

Figure 12:
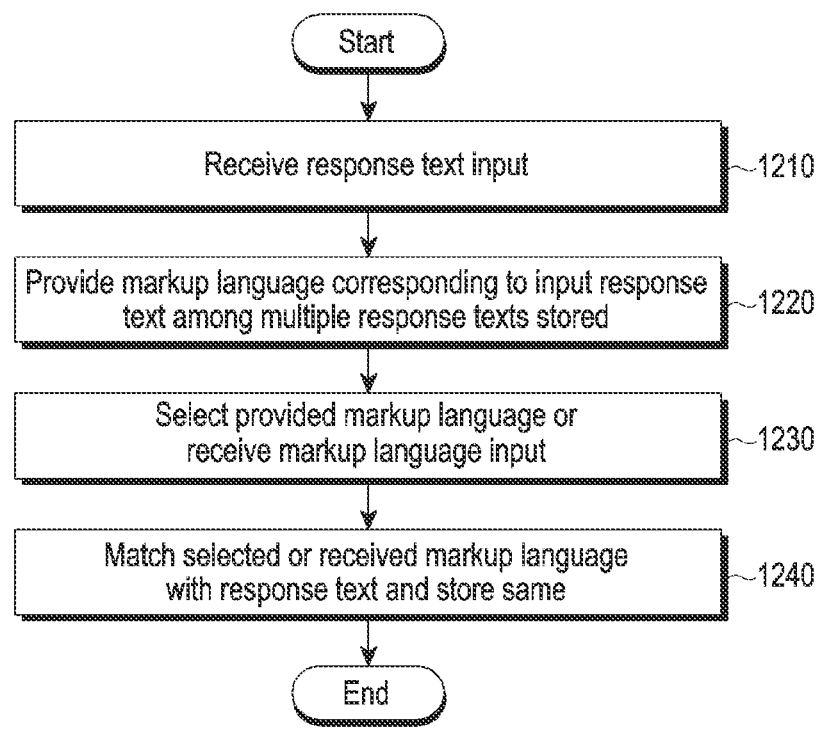
FIG. 12 is a flowchart illustrating an example operation of receiving a markup language or response text from a developer according to various embodiments.

FIG. 12 is a flowchart illustrating an example operation of receiving a markup language or response text from a developer according to various embodiments.

According to an embodiment, operations 1210, 1220, 1230 and 1240 may be understood as performed by the processor 250 of the electronic device (e.g., the electronic device 201 of FIG. 2).

Figure 13:
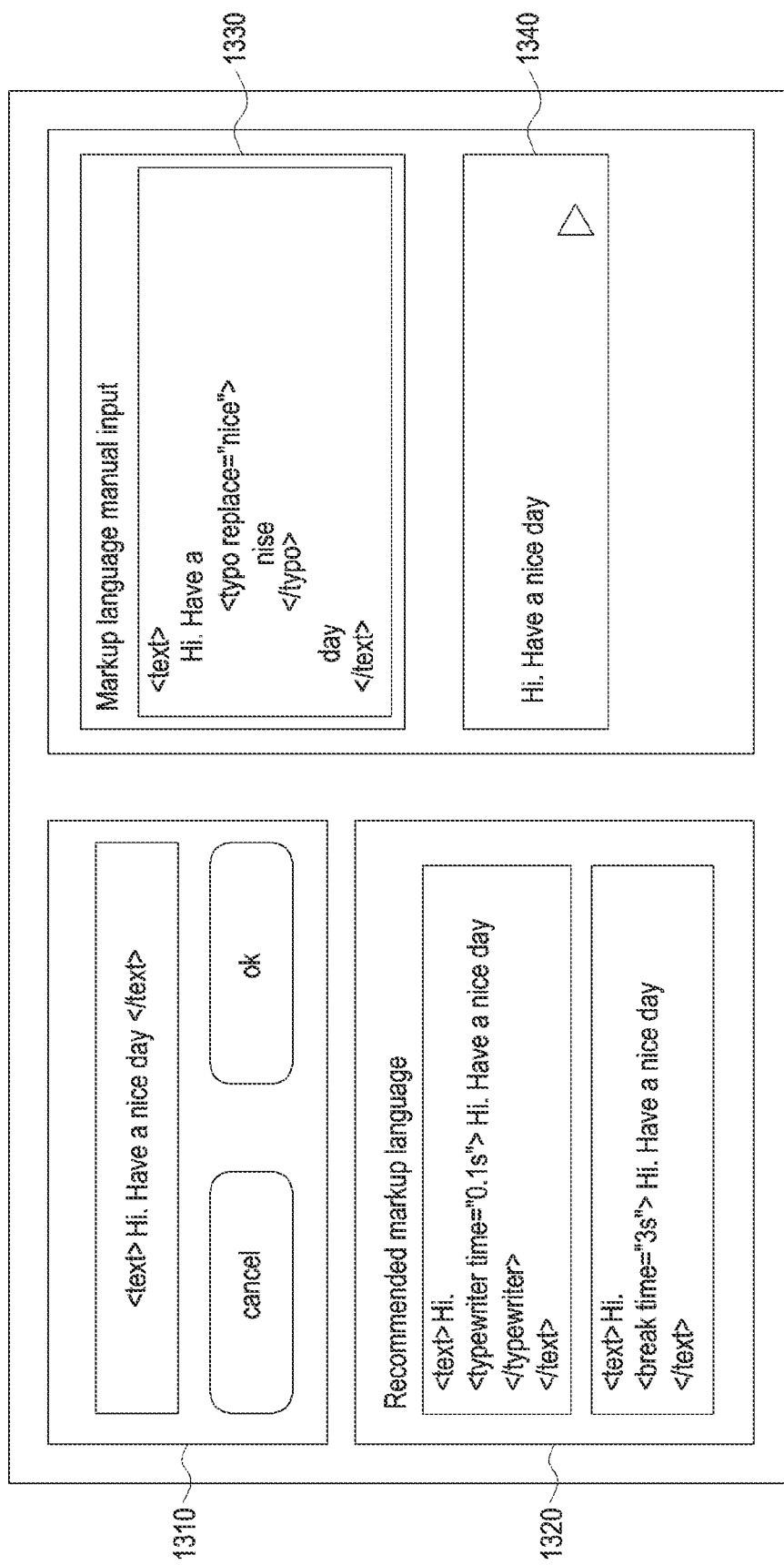
FIG. 13 is a diagram illustrating an example UI for inputting a markup language or response text by a developer according to various embodiments.

FIG. 13 is a diagram illustrating an example UI for inputting a markup language or response text by a developer according to various embodiments.

Referring to FIGS. 12 and 13, according to an embodiment, an electronic device (e.g., the developer's terminal device 201 of FIG. 2) may receive a response text input in operation 1210. According to an embodiment, the electronic device (e.g., the developer's terminal device 201 of FIG. 2)

may display a screen for inputting a response text as illustrated in FIG. 13. For example, the screen for inputting a response text may include a response text input area 1310, a markup language recommendation area 1320, a markup language manual input area 1330, and a response text reproduction area 1340. According to an embodiment, although not illustrated in FIG. 13, the screen for inputting a response text may further include an area for inputting emotion information about the response text.

According to an embodiment, the electronic device (e.g., the developer's terminal device 201 of FIG. 2) may receive a response text input by the developer into the response text input area 1310.

According to an embodiment, in operation 1220, the electronic device (e.g., the developer's terminal device 201 of FIG. 2) may provide a markup language corresponding to the input response text among a plurality of response texts stored. For example, the electronic device (e.g., the developer's terminal device 201 of FIG. 2) may display the markup language corresponding to the input response text among the plurality of response texts stored in the electronic device (e.g., the developer's terminal device 201 of FIG. 2) in the markup language recommendation area 1320 or may transmit the input response text to the server (e.g., the server 108 of FIG. 2) and, upon receiving a markup language corresponding to the response text from the server (e.g., the server 108 of FIG. 2), display the received markup language in the markup language recommendation area 1320.

According to an embodiment, the electronic device (e.g., the developer's terminal device 201 of FIG. 2) may natural-language-analyze the response text input to the response text input area 1310 by the user and provide the markup language or, when the user further inputs emotion information, may provide the markup language further considering the emotion information.

According to an embodiment, the electronic device (e.g., the developer's terminal device 201 of FIG. 2) may select the provided markup language or receive the markup language input in operation 1230. For example, the electronic device (e.g., the developer's terminal device 201 of FIG. 2) may receive the developer's input for selecting one of at least one markup language displayed in the markup language recommendation area 1320 or the markup language directly input by the developer through the markup language manual input area 1330.

According to an embodiment, the electronic device (e.g., the developer's terminal device 201 of FIG. 2) may match the selected markup language or received markup language with the response text and store them in operation 1240. For example, the electronic device (e.g., the developer's terminal device 201 of FIG. 2) may match the selected markup language or received markup language with the response text input to the markup language input area 1310 and store them in the memory of the electronic device (e.g., the developer's terminal device 201 of FIG. 2) or may transmit the response text-markup language match to the server (e.g., the server 108 of FIG. 2) to be stored in the response database of the server (e.g., the server 108 of FIG. 2). According to an embodiment, if emotion information is input by the user, the electronic device (e.g., the developer's terminal device 201 of FIG. 2) may match the selected or received markup language, and the input emotion information and response text input to the markup language input area 1310 and store them in the memory of the electronic device (e.g., the developer's terminal device 201 of FIG. 2) or may match the response text, markup language, and emotion information and transmit them to the server (e.g., the server 108 of FIG. 2).

According to an embodiment, in providing a response to a user utterance speech, a markup language is added to the response text according to the intent of the user's utterance and emotion information, and the response text is displayed with the markup language reflected. Therefore, the AI virtual assistant service may provide an enhanced emotional bond to the user.

According to an example embodiment, an electronic device comprises: a memory, a communication module comprising communication circuitry, and a processor operatively connected with the memory and the communication module. The processor is configured to control the electronic device to: obtain a utterance text corresponding to utterance speech, obtain an intent of the utterance text and emotion information based on the utterance speech and the utterance text, obtain a response text for the utterance text based on the intent of the utterance text and the emotion information, obtain a markup language including information about an output unit of text of the response text based on at least one of the intent of the utterance text, the emotion information, or the response text, and add the markup language to the response text and provide the response text. The output unit of text includes at least one selected from among a phoneme unit, a consonant and vowel unit, a syllable unit, or a word unit.

According to an example embodiment, the markup language may further include information about at least one of a text reproduction speed, a font, a font color, or a text reproduction pause.

According to an example embodiment, the processor may be configured to control the electronic device to obtain the markup language including information about a speed of a text output corresponding to the response text based on a speed of a sound output corresponding to the response text.

According to an example embodiment, the markup language may further include information about an operation for displaying a typographical error in at least a portion of the response text and, based on deleting the typographical error, displaying at least the portion of the response text.

According to an example embodiment, the markup language may be selected from among a plurality of markup languages stored in the memory, based on at least one of the response text, the intent of the utterance text, or the emotion information. The plurality of markup languages may each match at least one of a plurality of response texts, intents of a plurality of utterance texts, or a plurality of pieces of emotion information. The processor may be configured to select a markup language corresponding to at least one of a response text, an intent of utterance text, or emotion information having the highest similarity to the response text, the intent of the utterance text, or the emotion information, based on none of the plurality of markup languages matching the response text, the intent of the utterance text, or the emotion information.

According to an example embodiment, the markup language may match the response text. The response text and the matched markup language may be received from a developer's terminal device and stored in the memory.

According to an example embodiment, the processor may be configured to control the electronic device to, in response to the response text being received from the developer's terminal device: identify at least one response text whose similarity to the response text is a predetermined value or more among a plurality of response texts stored in the memory, provide at least one markup language used for the at least one response text among the plurality of markup languages previously stored in the memory, as the markup language for the response text, to the developer's terminal device, and in response to one of the at least one markup language being selected by the developer's terminal device or a markup language corresponding to the response text being input, match the selected markup language or the input markup language with the response text and store them in the memory.

According to an example embodiment, the memory may include a trained artificial intelligence (AI) model configured to output the intent of the input text and emotion information using text and speech as input data. The processor may be configured to obtain the emotion information and the intent of the utterance text for the user utterance speech and the utterance text using the trained AI model.

According to an example embodiment, the electronic device may further comprise a display. The processor may be configured to control the electronic device to display the response text in the selected text output unit.

According to an example embodiment, a method of controlling an electronic device comprises: obtaining a utterance text corresponding to utterance speech, obtaining an intent of the utterance text and emotion information based on the utterance speech and the utterance text, obtaining a response text for the utterance text based on the intent of the utterance text and the emotion information, obtaining a markup language including information about an output unit of text of the response text based on at least one of the intent of the utterance text, the emotion information, or the response text, and adding the markup language to the response text and providing the response text. The text output unit includes at least one selected from among a phoneme unit, a consonant and vowel unit, a syllable unit, or a word unit.

According to an example embodiment, the markup language may further include information about at least one of the reproduction speed, font, font color, font size, or reproduction pause of the, text.

According to an example embodiment, obtaining the markup language may include obtaining the markup language including information about a speed of a text output corresponding to the response text based on a speed of a sound output corresponding to the response text.

According to an example embodiment, the markup language may further include information about an operation for displaying a typographical error in at least a portion of the response text and, based on deleting the typographical error, displaying at least the portion of the response text.

According to an example embodiment, the markup language may be selected from among a plurality of markup languages stored in the memory, based on at least one of the response text, the intent of the utterance text, or the emotion information. The plurality of markup languages may each match at least one of a plurality of response texts, intents of a plurality of utterance texts, or a plurality of pieces of emotion information. Obtaining the markup language may include selecting a markup language corresponding to at least one of a response text, an intent of utterance text, or emotion information having the highest similarity to the response text, the intent of the utterance text, or the emotion information, based on none of the plurality of markup languages matching the response text, the intent of the utterance text, or the emotion information.

According to an example embodiment, the markup language may match the response text. The response text and the matched markup language may be received from a developer's terminal device and stored in the memory.

According to an example embodiment, the method may further comprise, in response to the response text being received from the developer's terminal device: identifying at least one response text whose similarity to the response text is a predetermined value or more among a plurality of response texts stored in the memory, providing at least one markup language used for the at least one response text among the plurality of markup languages stored in the memory, as the markup language for the response text, to the developer's terminal device, and in response to one of the at least one markup language being selected by the developer's terminal device or a markup language corresponding to the response text being input, matching the selected markup language or the input markup language with the response text and storing them in the memory.

According to an example embodiment, a memory of the electronic device may include a trained artificial intelligence (AI) model configured to output the intent of the input text and emotion information using text and speech as input data. The emotion information and the intent of the utterance text for the user utterance speech and the utterance text may be obtained using the trained AI model.

According to an example embodiment, the method may further comprise displaying the response text in the selected text output unit, on a display of the electronic device.

According to an example embodiment, a terminal device comprises: a microphone, a display, a communication module comprising communication circuitry, and a processor. The processor is configured to control the terminal device to: transmit utterance speech received through the microphone to an external server, receive a response text corresponding to the utterance speech from the external server, and display the response text on the display in at least one output unit of text selected from among a phoneme unit, a consonant and vowel unit, a syllable unit, or a word unit, based on a markup language including information about the text output unit added to the response text.

According to an example embodiment, the markup language may further at least one of the reproduction speed, font, font color, font size, or reproduction pause of the text.

The electronic device 101 according to various embodiments may be one of various types of electronic devices. The electronic devices may include, for example, a portable communication device (e.g., a smart phone, tablet PC, or e-book reader), a computer device, a portable multimedia device, a portable medical device, a camera, a wearable device, a home appliance, or the like. According to an embodiment of the disclosure, the electronic device is not limited to the above-listed embodiments.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added.

Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

The invention claimed is:

1. An electronic device, comprising:
a memory;
a communication module comprising communication circuitry; and
a processor, operatively connected with the memory and the communication module, configured to control the electronic device to:
obtain an utterance text corresponding to utterance speech;
obtain an intent of the utterance text and emotion information based on the utterance speech and the utterance text;
obtain a response text for the utterance text based on the intent of the utterance text and the emotion information;
obtain a markup language including information about an output unit of text of the response text based on at least one of the intent of the utterance text, the emotion information, or the response text; and
add the markup language to the response text and provide the response text, wherein
the output unit of text includes at least one selected from among a phoneme unit, a consonant and vowel unit, a syllable unit, or a word unit.

2. The electronic device of claim 1, wherein the markup language further includes information about at least one of a text reproduction speed, a font, a font color, or a text reproduction pause.

3. The electronic device of claim 1, wherein the markup language includes information about a speed of a text output corresponding to the response text based on a speed of a sound output corresponding to the response text.

4. The electronic device of claim 1, wherein the markup language further includes information about an operation for displaying a typographical error in at least a portion of the response text and, based on deleting the typographical error, displaying at least the portion of the response text.

5. The electronic device of claim 1, wherein the markup language is selected from among a plurality of markup languages stored in the memory, based on at least one of the response text, the intent of the utterance text, or the emotion information, wherein each of the plurality of markup languages match at least one of a plurality of response texts, intents of a plurality of utterance texts, or a plurality of pieces of emotion information, and wherein the processor is configured to control the electronic device to select a markup language corresponding to at least one of a response text, an intent of utterance text, or emotion information having a highest similarity to the response text, the intent of the utterance text, or the emotion information, based on none of the plurality of markup languages matching the response text, the intent of the utterance text, or the emotion information.

6. The electronic device of claim 1, wherein the markup language matches the response text, and wherein the response text and the matched markup language are received from a developer terminal device and stored in the memory.

7. The electronic device of claim 6, wherein the processor is configured to control the electronic device to:
in response to the response text being received from the developer terminal device, identify at least one response text having similarity to the response text of a predetermined value or more among a plurality of response texts stored in the memory;
provide at least one markup language used for the at least one response text among a plurality of markup languages stored in the memory, as a markup language for the response text, to the developer terminal device; and
in response to one of the at least one markup language being selected by the developer terminal device or a markup language corresponding to the response text is input, match the selected markup language or the input markup language with the response text and store the selected markup language or the input markup language in the memory.

8. The electronic device of claim 1, wherein the memory includes a trained artificial intelligence (AI) model configured to: output the intent of the utterance text and emotion information using text and speech as input data, and wherein the processor is configured to control the electronic device to obtain the emotion information and the intent of the utterance text for the utterance speech and the utterance text using the trained AI model.

9. The electronic device of claim 1, further comprising a display, wherein the processor is configured to control the electronic device to display, via the display, the response text in selected the output unit of text.

10. A method of controlling an electronic device, the method comprising:
obtaining an utterance text corresponding to utterance speech;
obtaining an intent of the utterance text and emotion information based on the utterance speech and the utterance text;
obtaining a response text for the utterance text based on the intent of the utterance text and the emotion information;
obtaining a markup language including information about an output unit of text of the response text based on at least one of the intent of the utterance text, the emotion information, or the response text; and
adding the markup language to the response text and providing the response text, wherein the output unit of text is at least one selected from among a phoneme unit, a consonant and vowel unit, a syllable unit, or a word unit.

11. The method of claim 10, wherein the markup language further includes information about at least one of a text reproduction speed, a font, a font color, a font size, or a text reproduction pause.

12. The method of claim 10, wherein the markup language includes information about a speed of a text output corresponding to the response text based on a speed of a sound output corresponding to the response text.

13. The method of claim 10, wherein the markup language further includes information about an operation for displaying a typographical error in at least a portion of the response text and, based on deleting the typographical error, displaying at least the portion of the response text.

14. The method of claim 10, wherein the markup language is selected from among a plurality of markup languages stored in a memory of the electronic device, based on at least one of the response text, the intent of the utterance text, or the emotion information, wherein each of the plurality of markup languages match at least one of a plurality of response texts, intents of a plurality of utterance texts, or a plurality of pieces of emotion information, and wherein obtaining the markup language includes selecting a markup language corresponding to at least one of a response text, an intent of utterance text, or emotion information having a highest similarity to the response text, the intent of the utterance text, or the emotion information, based on none of the plurality of markup languages matching the response text, the intent of the utterance text, or the emotion information.

15. The method of claim 14, wherein the markup language matches the response text, and wherein the response text and the matched markup language are received from a developer terminal device and stored in the memory.

16. The method of claim 15, further comprising:
in response to the response text being received from the developer terminal device, identifying at least one response text having a similarity to the response text being a predetermined value or more among a plurality of response texts stored in the memory;
providing at least one markup language used for the at least one response text among the plurality of markup languages stored in the memory, as a markup language for the response text, to the developer terminal device; and
in response to one of the at least one markup language being selected by the developer terminal device or a markup language corresponding to the response text being input, matching the selected markup language or the input markup language with the response text.

17. The method of claim 10, wherein a memory of the electronic device includes a trained artificial intelligence (AI) model configured to output the intent of the utterance text and emotion information using text and speech as input data, and wherein the emotion information and the intent of the utterance text for the utterance speech and the utterance text are obtained using the trained AI model.

18. The method of claim 10, further comprising displaying, via a display of the electronic device, the response text in selected the output unit of text.

19. A terminal device, comprising:
a microphone;
a display;
a communication module comprising communication circuitry; and
a processor configured to control the terminal device to:
transmit utterance speech received through the microphone to an external server;
receive a response text corresponding to the utterance speech from the external server; and
display the response text on the display in at least one text output unit selected from among a phoneme unit, a consonant and vowel unit, a syllable unit, or a word unit, based on a markup language including information about the at least one text output unit added to the response text.

20. The terminal device of claim 19, wherein the markup language further includes at least one of a text reproduction speed, a font, a font color, a font size, or a text reproduction pause.

* * * * *